(12) United States Patent
Goto et al.

(10) Patent No.: US 6,665,595 B1
(45) Date of Patent: Dec. 16, 2003

(54) DEVICE FOR TRANSMITTING OPTICAL DATA

(75) Inventors: Ikuo Goto, Aichi-ken (JP); Yoji Maejima, Osaka-fu (JP); Naohiro Shimaji, Osaka-fu (JP)

(73) Assignee: Hokuyo Automatic Co., Ltd., Osaka-Fu (JP)

( * ) Notice: Subject to any disclaimer, the term of this patent is extended or adjusted under 35 U.S.C. 154(b) by 722 days.

(21) Appl. No.: 09/630,873

(22) Filed: Aug. 2, 2000

(51) Int. Cl.[7] .............................................. G06F 19/00
(52) U.S. Cl. ...................... 701/23; 701/69; 356/3.03; 356/3.09; 356/73.1; 356/141.4; 180/169
(58) Field of Search .............................. 701/23, 24, 69, 701/26; 700/112, 113, 121; 702/81, 84, 118, 33, 36; 356/3.03, 3.07, 3.09, 3.11, 73.1, 139.07, 141.4, 375; 180/169

(56) References Cited

U.S. PATENT DOCUMENTS

| | | | | |
|---|---|---|---|---|
| 4,780,817 A | * | 10/1988 | Lofgren | 180/168 |
| 5,828,572 A | * | 10/1998 | Hasegawa et al. | 454/187 |
| 6,175,777 B1 | * | 1/2001 | Kim | 700/121 |
| 6,226,563 B1 | * | 5/2001 | Lim | 700/121 |
| 6,256,560 B1 | * | 7/2001 | Kim et al. | 701/23 |
| 6,438,441 B1 | * | 8/2002 | Jang et al. | 700/121 |
| 6,446,017 B1 | * | 9/2002 | Skidmore | 702/81 |
| 6,473,664 B1 | * | 10/2002 | Lee et al. | 700/110 |
| 6,516,238 B1 | * | 2/2003 | Kim et al. | 700/112 |

* cited by examiner

Primary Examiner—Thomas G. Black
Assistant Examiner—Tuan C To
(74) Attorney, Agent, or Firm—J. C. Patents

(57) ABSTRACT

There is provided a device for transmitting optical data installed in an automated guided vehicle and a plurality of manufacturing machines which are arranged on a manufacturing line so as to transmit data necessary for delivery of a transfer object by two-way communication within a transportation system. The transportation system has an interlocking mechanism for suspending an operation when a trouble occurs and transports the transfer object to the plurality of manufacturing machines by the automated guided vehicle. The device includes a non-volatile memory for recording and holding a communication log, and communication log recording means for writing a communication log in said non-volatile memory and outputting recorded contents of the communication log to an external device when there is an inquiry from the external device. Thereby the cause of the trouble can be promptly investigated

4 Claims, 5 Drawing Sheets

AUTOMATED GUIDED VEHICLE

SEMICONDUCTOR MANUFACTURING MACHINE

DEVICE FOR TRANSMITTING OPTICAL DATA

BACKGROUND OF THE INVENTION

The present invention relates to a device for transmitting optical data, which is installed in both of an automated guided vehicle and a manufacturing machine so as to transmit data necessary for delivery of a transfer object by two-way communication within a transportation system having an interlocking mechanism, and more particularly relates to a device for transmitting optical data, which includes a non-volatile memory for recording and holding a communication log, reads the communication log when a trouble occurs and promptly investigates the cause of the trouble.

On the manufacturing line of a semiconductor device or a liquid crystal display, semiconductor wafers or the substrates of the liquid crystal display are transferred to a plurality of manufacturing machines arranged in a building by an automated guided vehicle according to the process.

FIGS. 6(a), 6(b) and 6(c) show the states of delivery of a carrier 4 as a transfer object storing a semiconductor wafer 3 between an automated guided vehicle 1 and a semiconductor manufacturing machine 2 by an AMHS (Automated Material Handling System) on a manufacturing line of a semiconductor device. FIG. 6(a) shows a state in which the automated guided vehicle 1 is a self-running AGV (Automated Guided Vehicle) that runs on wheels and the carrier 4 is loaded on the semiconductor manufacturing machine 2 by an arm 5 and a hand 6 of the AMHS. FIG. 6(b) shows a state in which the automated guided vehicle 1 is an RGV (Rail Guided Vehicle) that runs along a guide rail 7 fixed to the floor and the carrier 4 is loaded in the same manner as above by the AMHS. FIG. 6(c) shows a state in which the automated guided, vehicle 1 is an OHT (Overhead Hoist Transport) that runs along a guide rail 8 fixed to the ceiling and the carrier 4 is loaded by a hoist 9 and a hand 10 of the AMHS.

The above-mentioned delivery of the carrier 4 is performed by host computers installed in the automated guided vehicle 1 and the semiconductor manufacturing machine 2, respectively, according to the instructions from a control system that controls the entire manufacturing line. During the delivery, it is necessary to operate the automated guided vehicle 1 and the semiconductor manufacturing machine 2 interactively. Therefore, sending and receiving of necessary data are performed by optical data transmission devices 11 installed in both of the automated guided vehicle 1 and the semiconductor manufacturing machine 2.

The optical two-way communication between the automated guided vehicle 1 and the semiconductor manufacturing machine 2 s carried out when the automated guided vehicle 1 reaches a position where it faces the semiconductor manufacturing machine 2. The contents of this communication when loading the carrier 4 from the automated guided vehicle 1 on the semiconductor manufacturing machine 2 are such that the automated guided vehicle 1 sends transfer port specifying signals (CS_0, CS_1), a port use signal (VALID), a transfer request signal (TR_REQ), a busy signal (BUSY) and a complete signal (COMPT) to the semiconductor manufacturing machine 2, and the semiconductor manufacturing machine 2 sends an acceptance request signal (L_REQ) and an acceptance permission signal (READY) to the automated guided vehicle 1. These signals continue to be sent or received during a period of time when the delivery of he carrier 4 is being carried out.

Similarly, on the manufacturing line of a liquid crystal display, since the liquid crystal display is manufactured by similar processing steps though a glass substrate of a slightly larger size is used instead of the semiconductor wafer 3, the transfer is performed in the manner similar to that shown in FIGS. 6(a), 6(b) and 6(c).

Since the transfer objects of these manufacturing lines are very expensive and easily broken, it is necessary to handle them carefully so as not to give them shock. Hence, the transportation system for them has an interlocking mechanism that immediately suspends the transfer operation when some trouble occurs.

In the above-mentioned transportation system, when a trouble occurs due to some cause, the interlocking function is performed to suspend the operation for safe reasons. Although the frequency of occurrence of trouble is low, it is unknown when and where trouble occurs. In this case, it is necessary to investigate the cause of trouble and deal with the cause so as to prevent reoccurrence of the same trouble.

This interlocking performed due to a trouble often occurs during the delivery of the transfer object which is carried out by executing a plurality of steps by each of the automated guided vehicle and the manufacturing machine while performing data transmission therebetween. The host computer activates the interlocking function of its own vehicle or device immediately when a trouble occurs in its own vehicle or device. On the other hand, when a trouble occurs in the vehicle or device of the other host computer, the host computer detects the trouble from a fact that a response to the sent signals has not been received in a certain period of time, and activates the interlocking function.

Thus, when the interlocking function is activated, if it is possible to identify which step of the delivery of the transfer object involves with the trouble from the contents of data sent or received just before the occurrence of trouble, the cause can be investigated relatively easily.

However, a conventional optical data transmission device does not have a function of recording the communication history. Hence, if the transportation system is suspended, it is necessary to investigate the whole system and thus it takes a long time for recovery, causing a considerable lowering of the manufacturing efficiency of the manufacturing line.

SUMMARY OF THE INVENTION

An object of the present invention is to provide a device for transmitting optical data, which records a communication log for a certain period of time and reads the communication log when a trouble occurs so as to promptly investigate the cause of the trouble.

The present invention is a device for transmitting optical data, which is installed in both of an automated guided vehicle and a plurality of manufacturing machines arranged on a manufacturing line so as to transmit data necessary for delivery of a transfer object by two-way communication within a transportation system having an interlocking mechanism for suspending an operation when a trouble occurs and transporting the transfer object to the manufacturing machines by the automated guided vehicle, characterized by including: a non-volatile memory for recording and holding a communication log; and communication log recording means for writing a communication log in the non-volatile memory and outputting the recorded contents of the communication log to an external device when there is an inquiry from the external device.

The communication log stored in the non-volatile memory is a historical record of two-way data communication performed between the automated guided vehicle and the manufacturing machine during one delivery, and records the steps until the transportation system suspends the operation by interlocking. Therefore, if the communication log is read when a trouble occurred, it is possible to know the process of the delivery operation performed between the automated guided vehicle and the manufacturing machine until the interlocking occurred. Consequently, the cause of the trouble can be promptly investigated.

Incidentally, at least one of the devices for transmitting optical data installed in the automated guided vehicle and manufacturing machine need to have the communication log recording means.

In the above-described structure, it is possible to allow the non-volatile memory to have a storage capacity capable of recording a series of communication log for one delivery and the communication log recording means to clear the recorded contents of the non-volatile memory when starting the communication for the delivery of the transfer object and then start recording a series of communication log.

This arrangement is made because the communication log of one delivery performed just before the occurrence of a trouble is necessary and sufficient for investigating the cause of the trouble. Accordingly, since only this communication log is to be stored, the storage capacity of the non-volatile memory is made smaller, thereby facilitating the investigation of the cause of the trouble.

Moreover, in the above-described structure, it is possible to allow the communication log recording means to include optical communication means for receiving an inquiry about a communication log from an external device through a light emitting and receiving device and for outputting the communication log recorded in the non-volatile memory in response to the inquiry.

This arrangement makes it possible to investigate the cause of a trouble immediately on the spot where the automated guided vehicle is suspended, by reading the communication log with the use of a portable light transmitter-receiver.

In the present invention the communication log of the optical data transmission performed during the delivery of the transfer object between the automated guided vehicle and the manufacturing machine is recorded in the non-volatile memory and the stored contents is allowed to be read, if necessary. Therefore, when a trouble occurs, it is possible to promptly investigate the cause of the trouble and recover the transportation system having the interlocking mechanism, thereby improving the manufacturing efficiency.

The nature, principle, and utility of the invention will become more apparent from the following detailed description when read in conjunction with the accompanying drawings in which like parts are designated by like reference numerals.

DESCRIPTION OF THE PREFERRED EMBODIMENTS

Figure 1:
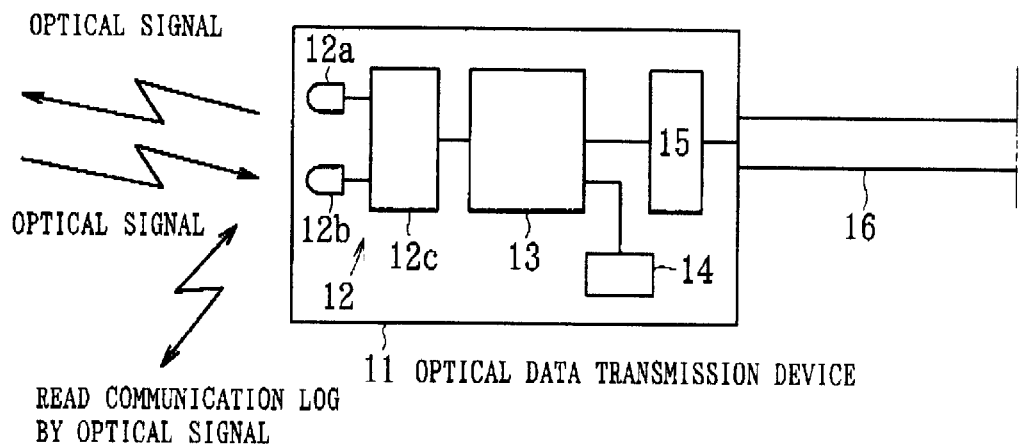
FIG. 1 shows an example of the structure of a device for transmitting optical data of the present invention.

The following description will explain an embodiment in which the present invention is applied to a manufacturing line of a semiconductor device. In FIG. 1, reference numeral 11 indicates an optical data transmission device having a communication log recording function of the present invention. This device includes a light emitting and receiving section 12, a control section 13, a non-volatile memory 14 and an input/output interface 15.

The light emitting and receiving section 12 is composed of a light emitting element 12a such as an LED, a light receiving element 12b such as a photodiode, and a transmitter-receiver circuit 12c. The transmitter-receiver circuit 12c causes the light emitting element 12a to emit light by a modulated signal obtained by modulating transmitted data by a predetermined carrier, amplifies a light reception output of the light receiving element 12b, and then detects and decodes the amplified output to obtain received data.

The control section 13 is composed of CPU, etc., controls the transmission and reception of data, and includes communication log recording means for recording a communication log. As the non-volatile memory 14, for example, EEPROM having a storage capacity capable of storing a series of communication log transmitted and received during the delivery of a carrier as a transfer object is used to record and hold the communication log.

Reference numeral 15 is the input/output interface for providing a connection to a host computer, which instructs a data transmission, by a connecting line 16.

Figure 2:
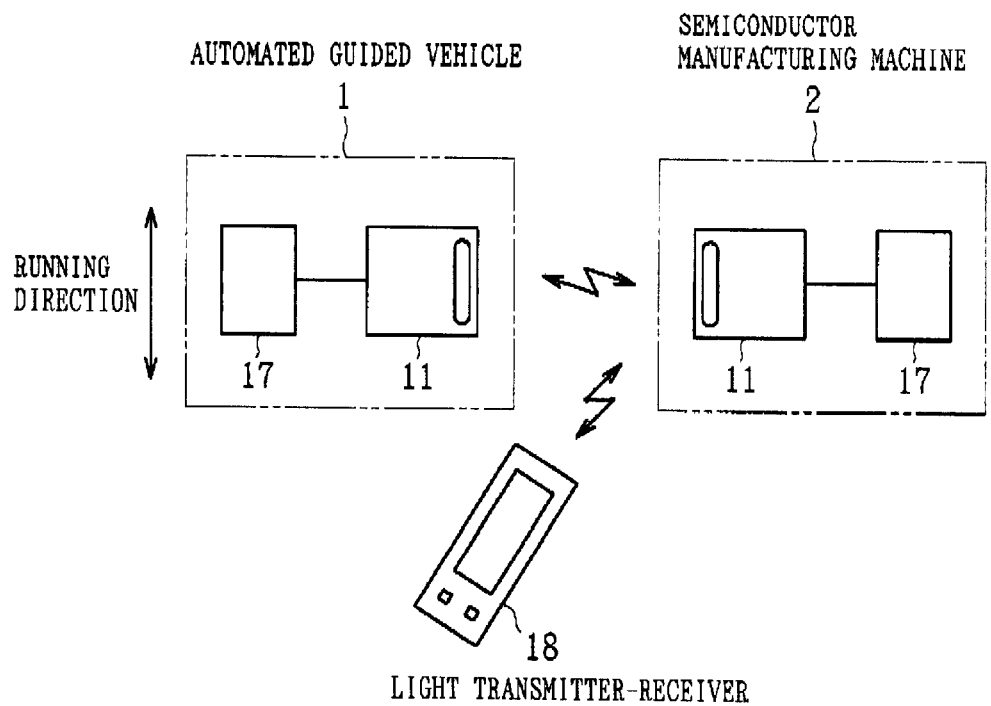
FIG. 2 shows an example of time installation of the device for transmitting optical data of the present invention in an automated guided vehicle and a semiconductor manufacturing machine.

As shown in FIG. 2, the above-described optical data transmission devices 11 are installed in an automated guided vehicle 1 and a semiconductor manufacturing machine 2, respectively, and connected to host computers 17. The host computers 17 perform delivery control and running control of the carrier upon instructions from a control system that controls the entire manufacturing line. The two-way data transmission between the sender and receiver of the carrier is performed by the optical data transmission devices 11.

In FIG. 2, reference numeral 18 indicates a light transmitter-receiver used for reading a communication log from the optical data transmission device 11. For example, by pressing a communication log read switch in a state in which the light emitting and receiving section of the light transmitter-receiver 18 is directed to the light emitting and receiving section of the optical data transmission device 11, the light transmitter-receiver 18 displays the contents of the communication log on a display.

The communication log recorded by the communication log recording means provided in the control section 13 as a characteristic feature of the present invention records input and output signals representing the carrier delivery process between the automated guided vehicle 1 and the semiconductor manufacturing machine 2 and the passage of time. When loading a carrier 4 from the automated guided vehicle 1 on the semiconductor manufacturing machine 2, for example, the input and output signals are transmitted as shown in the timing chart of FIG. 3.

Figure 3:
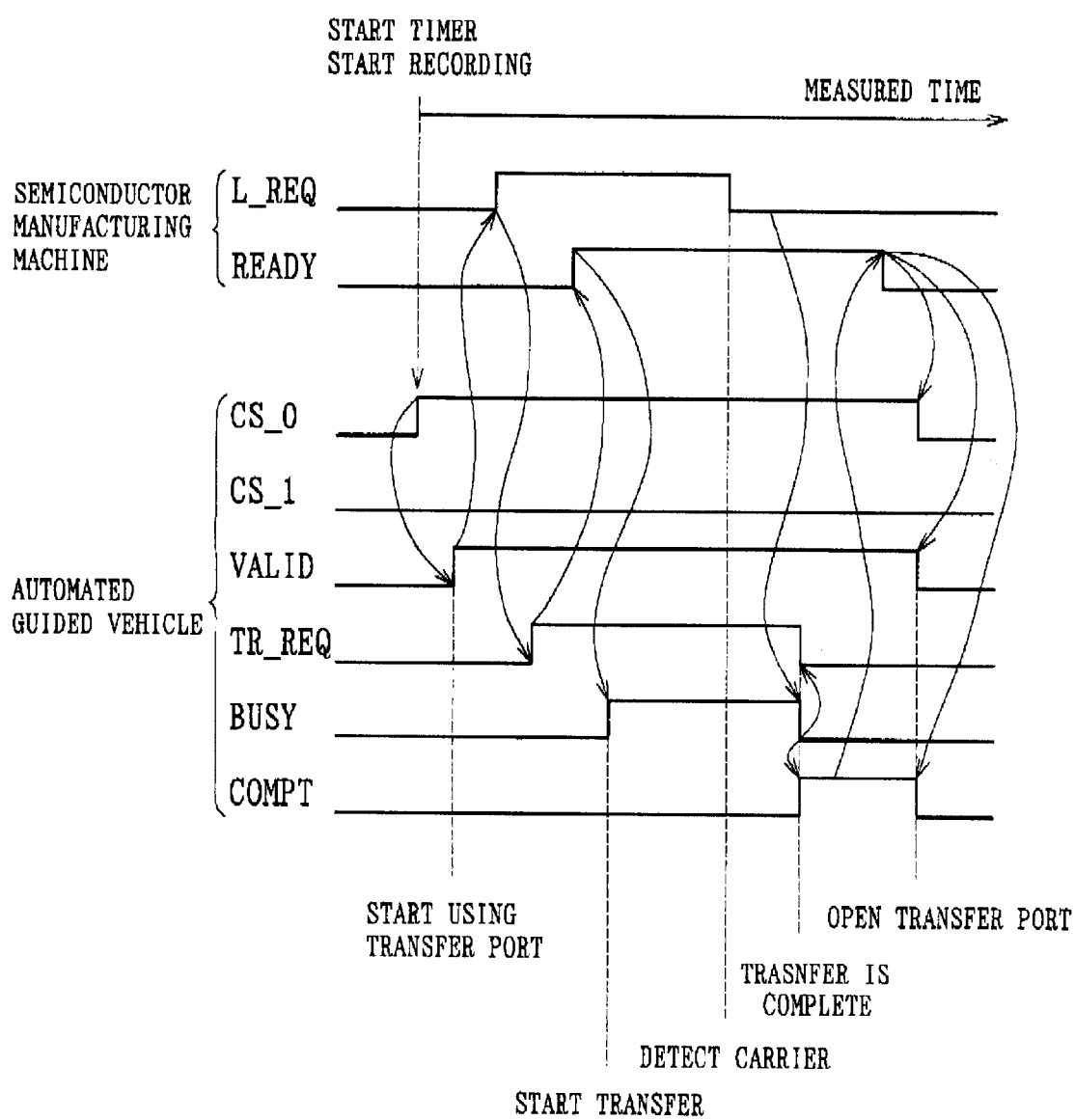
FIG. 3 is a timing chart of input and output signals of the automated guided vehicle and semiconductor manufacturing machine during the delivery of a transfer object.

In FIG. 3, L_REQ and READY in the upper rows represent input and output signals indicating the internal state of the semiconductor manufacturing machine 2, and are sent to the automated guided vehicle 1. CS_0, CS_1, VALID, TR_REQ, BUSY and COMPT in the lower rows represent input and output signals indicating the internal state of the automated guided vehicle 1, and are sent to the semiconductor manufacturing machine 2. Since each of these signals is 1-bit data, it is sent by alotting one signal to each bit of one 8-bit transfer frame. This one transfer frame is subjected to parallel processing in the optical data transmission device 11, but is serially transmitted during the optical communication.

The input and output signals continue to be transmitted mutually between the automated guided vehicle 1 and the semiconductor manufacturing machine 2 during the carrier delivery period so that the automated guided vehicle 1 and the semiconductor manufacturing machine 2 know the states of the opposite party. Each of the automated guided vehicle 1 and the semiconductor manufacturing machine 2 changes its own input and output signals in accordance with the changes in the input and output signals of the semiconductor manufacturing machine 2 or automated guided vehicle 1 as the opposite party and the progress of its work, and causes the carrier delivery process to proceed.

The following description will explain FIG. 3 in detail. When the automated guided vehicle 1 arrives a position where it faces the semiconductor manufacturing machine 2, it first turns on the transfer port specifying signal (CS_0) for loading and further turns on the port use signal (VALID) to let the semiconductor manufacturing machine 2 know the arrival. Upon the receipt of the signals, the semiconductor manufacturing machine 2 sends the acceptance request signal (L_REQ) and starts preparing, for example, opening the shutter of an acceptance port (not shown), so as to receive the carrier 4.

Upon receipt of the acceptance request signal (L_REQ), the automated guided vehicle 1 turns on the transfer request signal (TR_REQ) and sends it to the semiconductor manufacturing machine 2.

After receiving the transfer request signal (TR_REQ), if the preparation for receiving the carrier 4 has been complete, the semiconductor manufacturing machine 2 turns on the acceptance permission signal (READY) and sends it to the automated guided vehicle 1. Upon receipt of the acceptance permission signal (READY), the automated guided vehicle 1 turns on the busy signal (BUSY) to start a transfer operation. When the semiconductor manufacturing machine 2 detects the transferred carrier 4, it turns off the acceptance request signal (L_REQ) to let the automated guided vehicle 1 know this state. When the automated guided vehicle 1 completes the transfer of the carrier 4, it turns off the transfer request signal (TR_REQ) and busy signal (BUSY) and turns on the complete signal (COMPT).

When the semiconductor manufacturing machine 2 receives he complete signal (COMPT), it turns off the acceptance permission signal (READY) after completing the storage of the carrier 4 therein through the acceptance port. Accordingly, the automated guided vehicle 1 turns off the port specifying signal (CS_0), port use signal (VALID) and complete signal (COMPT) to complete the carrier delivery.

Figure 4:
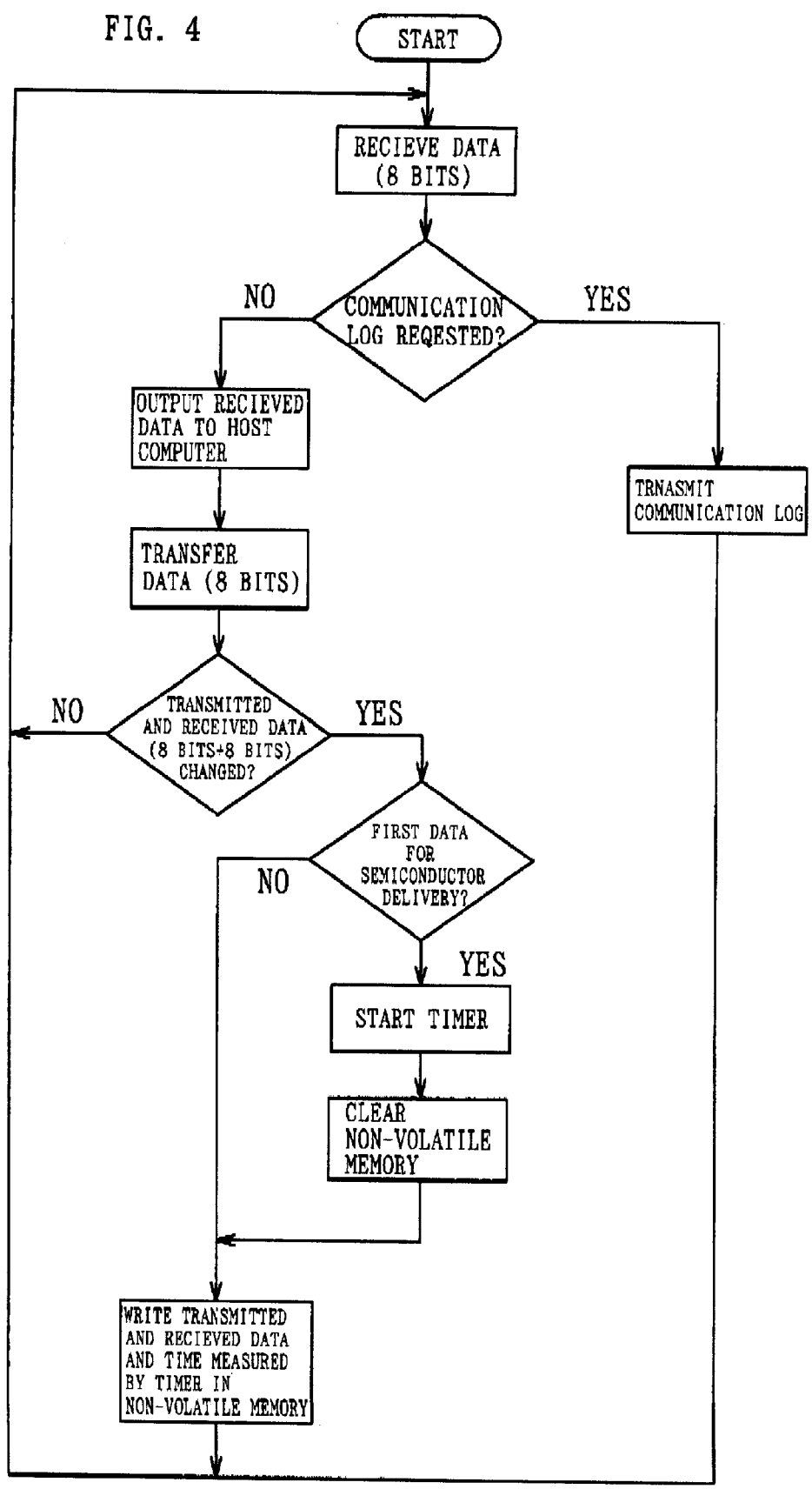
FIG. 4 is a flow chart showing the recording process of a communication log performed by communication log recording means in a control section and the external output process in response to an inquiry.

Next, referring to FIG. 4, the recording process performed by the communication log recording means provided in the control section 13 as a characteristic feature of the present invention and the output process performed by communication log output means in response to an inquiry about the communication log will be explained.

The control section 13 shown in FIG. 1 performs the transmission and reception of input and output signals with the opposite party through the light emitting and receiving section 12 as described above, and monitors whether there is an inquiry about the communication log from the light transmitter-receiver 18 shown in FIG. 2.

When data is received, the control section 13 judges whether the data is an inquiry about the communication log from the light transmitter-receiver 18.

If the data is not the inquiry, the control section 13 outputs the data to the host computer 17 and transmits the input and output signals of its own device or vehicle, When one series of transmission and reception is complete, the control section 13 judges whether there is a change from the previously transmitted and received data (8 bits+8 bits). If there is a change of at least ore bit, the change produces a change point in the timing chart shown FIG. 3 and therefore the change point is recorded by the communication log recording means.

This recording is started when the transmission and reception of the data are judged to be the first step of the transmission and reception performed for one delivery of a semiconductor. The judgement as to whether the transmission and reception of the data is the first step is made by, for example, whether the transfer port specifying signals (CS_0, Cs_1) are turned on. When the transmission and reception of the data is judged to be the first step, the timer possessed by the communication log recording means is started and simultaneously the contents of the non-volatile memory 14 are cleared by initializing a pointer indicating a write address of the communication log.

Recording of the change point of the transmitted and received data is executed by writing the transmitted and received data (8 bits+8 bits) at that point and additionally writing the time measured by the timer (the measured time immediately after the start from count 0 when the transmission and reception of the data is the first step) in the non-volatile memory 14. With this storage system, the timing chart shown in FIG. 3 can be perfectly reproduced later.

At the conditional branch of the flow chart, if the data is judged to be an inquiry about the communication log, the communication log output means outputs the communication log. This means that the contents of the communication log recorded and held in the non-volatile memory 14 are output to the light transmitter-receiver 18 shown in FIG. 2 by the light emitting and receiving section 12, and the light transmitter-receiver 18 which has received the contents of the communication log reproduces the timing chart of the input and output signals shown in FIG. 3 and displays it on the display. Consequently, the cause of the trouble can be promptly investigated.

The application of the present invention to the manufacturing line of a semiconductor device has been explained above. However, it is also possible to apply the present invention to a transportation system using an automated guide vehicle with an interlocking mechanism, such as the manufacturing line of a liquid crystal display.

For example, since the manufacturing line of a liquid crystal display includes the processing steps similar to those of the manufacturing line of a semiconductor device, the process of the transfer object delivery and the contents of communication performed between the automated guided vehicle and the manufacturing machine are substantially the same.

Figure 5:
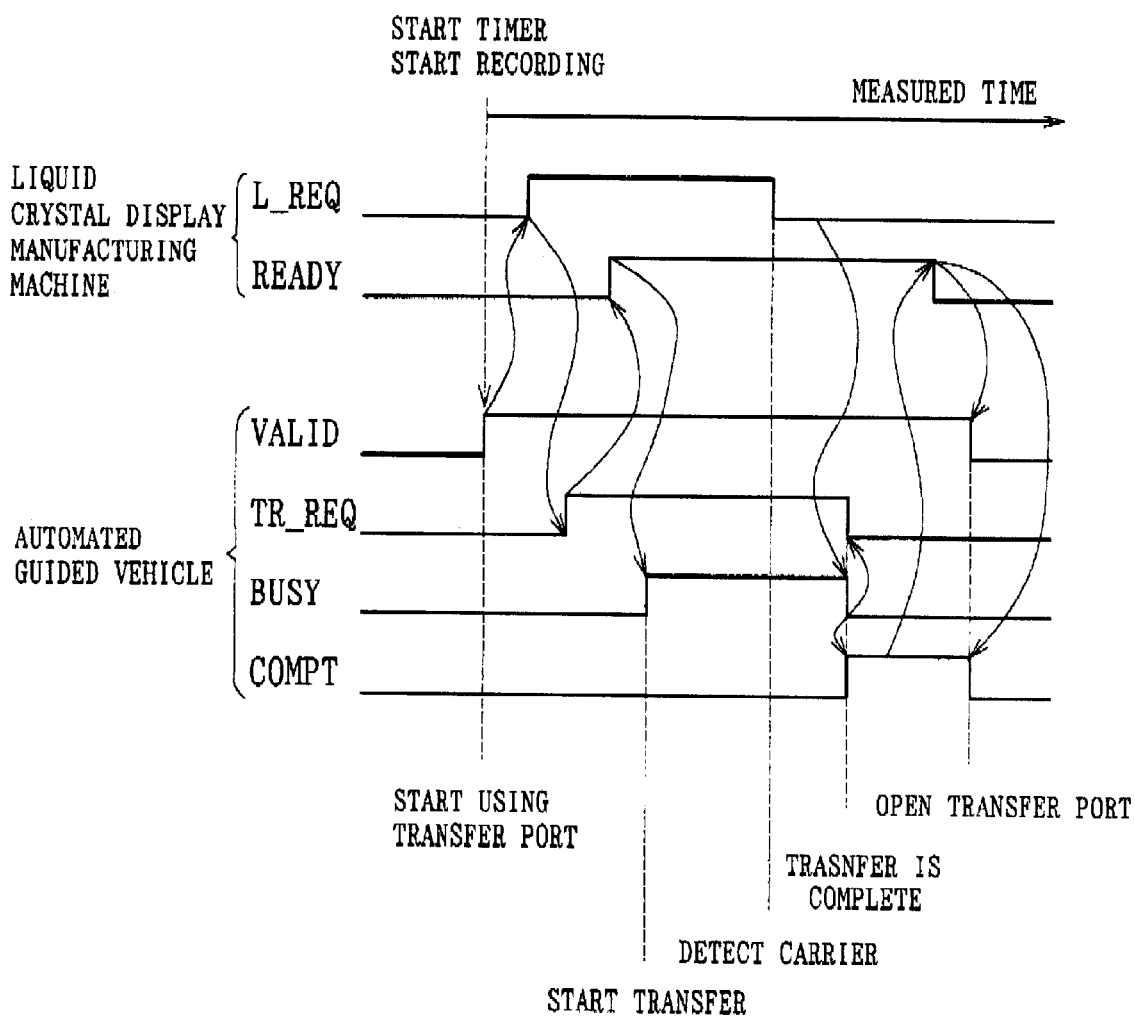
FIG. 5 is a timing chart of input and output signals of an automated guided vehicle and a liquid crystal display manufacturing machine during the delivery of a transfer object.
Figure 6A:
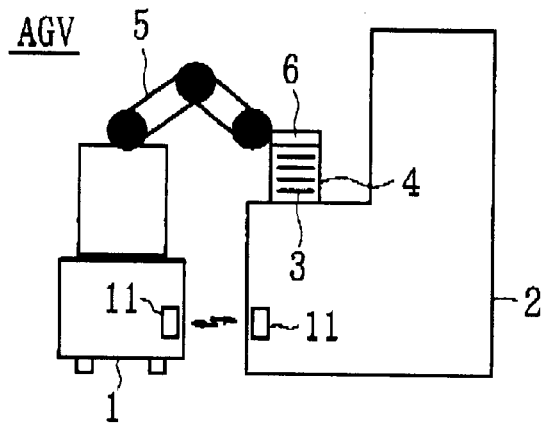
FIG. 6 shows a delivery operation of a transfer object performed between an automated guided vehicle and a semiconductor manufacturing machine for each type of automated guided vehicle.
Figure 6B:
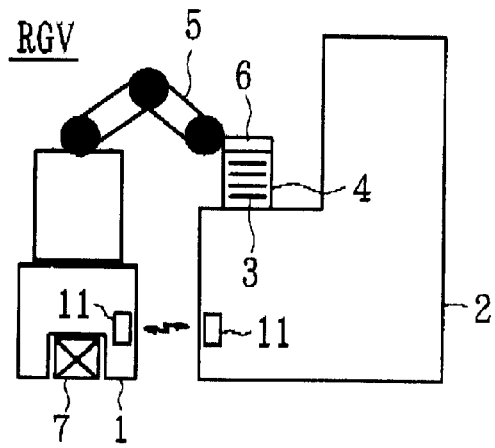
Figure 6C:
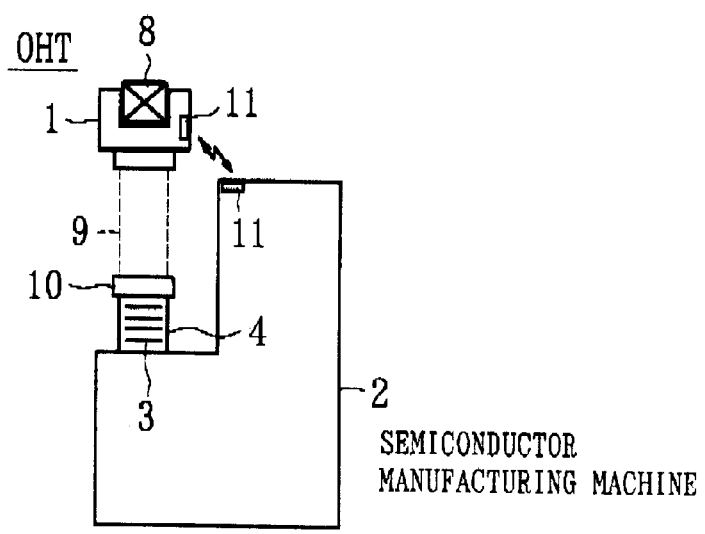

FIG. 5 shows a timing chart of the input and output signals recorded as a communication log on the manufacturing line of a liquid crystal display. Since the liquid crystal display has a large substrate size, a manufacturing machine having one transfer object delivery port is used. Therefore, it would be appreciated from a comparison with FIG. 3 that the transfer port specifying signals (CS_0, CS_1) are not used. Thus, the judgment as to whether the transmission and reception of data is the first step is made by detecting whether the port use signal (VALID) is turned on.

Further, the objective of the communication log recording function of the present invention can be achieved if either of the automated guided vehicle 1 and manufacturing machine 2 that perform optical communication has this function. Hence, a device for transmitting optical data having the function of the present invention may be provided in one of them, and a device for transmitting optical data having no communication log recording function may be provided in the other.

While there has been described what are at present considered to be preferred embodiments of the invention, it will be understood that various modifications may be made thereto, and it is intended that the appended claims cover all such modifications as fail within the true spirit and scope of the invention.

What is claimed is:

1. A device for transmitting optical data installed in both of an automated guided vehicle and a plurality of manufacturing machines arranged on a manufacturing line so as to transmit data necessary for delivery of a transfer object by two-way communication within a transportation system having an interlocking mechanism for suspending an operation when a trouble occurs and transporting the transfer object to the plurality of manufacturing machines by the automated guided vehicle, said device comprising:

a non-volatile memory for recording and holding a communication log; and communication log recording means for writing a communication log in said non-volatile memory and outputting recorded contents of the communication log to an external device when there is an inquiry from the external device.

2. The device for transmitting optical data according to claim 1, wherein said non-volatile memory has a storage capacity capable of recording a series of communication log for one delivery of the transfer object, and said communication log recording means clears the recorded contents of said non-volatile memory when starting communication for the delivery of the transfer object, and then starts recording of a series of communication log.

3. The device for transmitting optical data according to claim 1, wherein said communication log recording means comprises optical communication means for receiving an inquiry about a communication log from an external device and outputting the communication log recorded in said non-volatile memory in response to the inquiry through a light emitting and receiving device.

4. The device for transmitting optical data according to claim 2, wherein said communication log recording means comprises optical communication means for receiving an inquiry about a communication log from an external device and outputting the communication log recorded in said non-volatile memory in response to the inquiry through a light emitting and receiving device.

* * * * *